United States Patent
Todo et al.

(10) Patent No.: US 6,732,192 B2
(45) Date of Patent: May 4, 2004

(54) DISC RECORDING SCHEME FOR ENABLING QUICK ACCESS TO DISC DATA

(75) Inventors: Hirofumi Todo, Tokyo (JP); Makoto Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 09/794,889

(22) Filed: Feb. 26, 2001

(65) Prior Publication Data

US 2001/0026503 A1 Oct. 4, 2001

(30) Foreign Application Priority Data

Feb. 29, 2000 (JP) ........................ 2000-054250

(51) Int. Cl.$^7$ ................... G06F 12/00; G06F 12/08
(52) U.S. Cl. ............... 710/3; 707/1; 707/2; 707/100; 707/101; 707/102; 707/104.1; 707/200; 707/205; 711/1; 711/100; 711/200; 711/202; 711/205; 711/206; 711/207; 711/208; 711/209; 711/217; 711/218; 711/220; 715/514; 715/530; 715/539; 369/30.01; 369/96; 369/98; 369/272; 369/273; 369/280; 360/48; 360/49; 360/72.1
(58) Field of Search .................. 369/30, 56, 96, 369/98, 272, 273, 280; 360/48, 49, 72.1; 386/125, 126; 707/1, 2, 100, 101, 102, 104.1, 200, 205, 206; 711/1, 100, 112, 165, 200, 202, 205, 206–209, 217, 218, 220; 715/514, 517, 518, 520, 522, 530, 539; 710/3, 38

(56) References Cited

U.S. PATENT DOCUMENTS

| | | | | |
|---|---|---|---|---|
| 5,657,479 A | * | 8/1997 | Shaw et al. | 345/553 |
| RE35,881 E | * | 8/1998 | Barrett et al. | 707/1 |
| 5,798,995 A | * | 8/1998 | Fukushima et al. | 386/98 |
| 6,292,625 B1 | * | 9/2001 | Gotoh et al. | 386/95 |
| 6,356,706 B1 | * | 3/2002 | Ando et al. | 386/95 |
| 6,446,034 B1 | * | 9/2002 | Egolf | 703/27 |
| 6,512,882 B1 | * | 1/2003 | Teunissen | 386/70 |
| 6,546,452 B2 | * | 4/2003 | Ando et al. | 711/4 |
| 2003/0076764 A1 | * | 4/2003 | Iwano et al. | 369/99 |

* cited by examiner

Primary Examiner—Jeffrey Gaffin
Assistant Examiner—Tanh Q Nguyen
(74) Attorney, Agent, or Firm—Frommer Lawrence & Haug LLP; William S. Frommer; Bruno Polito (57) ABSTRACT

A system for recording data to a disc shaped record medium. The data is recorded according to a universal disc format employing a hierarchical file system, and data within the hierarchical structure is referenced using pointer information. The pointer information includes a file identifier descriptor and a file entry and is recorded such that the pointer information and its corresponding substantive data are stored at successive addresses.

7 Claims, 10 Drawing Sheets

| LSN | Description | Structure | LBN |
|---|---|---|---|
| 0 to 15 | Reserved (all 00h bytes) | | |
| 16 | Beginning Extended Area Descriptor | Volume Recognition Sequence (VRS) | |
| 17 | NSR Descriptor | | |
| 18 | Terminating Extended Area Descriptor | | |
| 19 to 31 | Reserved (all 00h bytes) | | |
| 32 | Primary Volume Descriptor | Main Volume Descriptor Sequence (MVDS) | Not Assigned |
| 33 | Implementation Use Volume Descriptor | | |
| 34 | Partition Descriptor | | |
| 35 | Logical Volume Descriptor | | |
| 36 | Unallocated Space Descriptor | | |
| 37 | Terminating Descriptor | | |
| 38 to 47 | Trailing Logical Sectors (all 00h bytes) | | |
| 48 | Logical Volume Integrity Descriptor | Logical Volume Integrity Sequence (LVIS) | |
| 49 | Terminating Descriptor | | |
| 50 to 63 | Trailing Logical Sectors (all 00h bytes) | | |
| 64 to 255 | Reserved (all 00h bytes) | | |
| 256 | Anchor Volume Descriptor Pointer | First Anchor Point | |
| 257 to 271 | all 00h bytes Data | | |
| 272 to Last LSN-272 | Descriptors for File Structure and Files | Partition (LVS) | 0 to Last LBN |
| Last LSN-271 to Last LSN-257 | all 00h bytes Data | | |
| Last LSN-256 | Anchor Volume Descriptor Pointer | Second Anchor Point | |
| Last LSN-255 to Last LSN-224 | Reserved (all 00h bytes) | | |
| Last LSN-223 | Primary Volume Descriptor | Reserve Volume Descriptor Sequence (RVDS) | Not Assigned |
| Last LSN-222 | Implementation Use Volume Descriptor | | |
| Last LSN-221 | Partition Descriptor | | |
| Last LSN-220 | Logical Volume Descriptor | | |
| Last LSN-219 | Unallocated Space Descriptor | | |
| Last LSN-218 | Terminating Descriptor | | |
| Last LSN-217 to Last LSN-208 | Trailing Logical Sectors (all 00h bytes) | | |
| Last LSN-207 to Last LSN-1 | Reserved (all 00h bytes) | | |
| Last LSN | Anchor Volume Descriptor Pointer | Third Anchor Point | |

DISC RECORDING SCHEME FOR ENABLING QUICK ACCESS TO DISC DATA

BACKGROUND OF THE INVENTION

1. Field of the Invention

The present invention relates to a recording method and a recording apparatus for recording data to a disc shaped rewritable record medium having a large record capacity. The present invention also relates to such a record medium.

2. Description of the Related Art

In recent years, high density optical discs such as a DVD (Digital Versatile Disc) have been developed and standardized. A logical format referred to as UDF (Universal Disc Format) has been proposed. For a DVD-RAM (DVD-Random Access Memory), the UDF is used. The UDF can be also applied to a CD-R that is a writable disc of a CD-ROM (Compact Disc Read Only Memory) and a CD-RW that is a rewritable disc thereof.

In the UDF, a hierarchical file system is used. Corresponding to information stored in the root directory, a sub directory and a substantial file thereof are referenced. Corresponding to information stored in the sub directory, another sub directory and a substantial file thereof are referenced.

Next, the hierarchical file system of the UDF will be described in detail. In the record area of the disc, data is accessed sector by sector. In the DVD-RAM, the record area is accessed from the inner periphery to the outer periphery of the disc. A volume information area is formed from the innermost periphery of the disc to the lead-in area thereof. The volume information area is referred to as system area. The system area represents the position of a file entry (FE) of the root directory. The FE is composed of an allocation descriptor (AD). The AD is information represents the address and length of a root directory, a sub directory, or a file.

The AD of the FE of the root directory represents the logical address and length of the root directory as a substance. The root directory contains at least one file identifier descriptor (FID). The FID references the FE of a sub directory contained in the root directory and the FE of a file contained in the sub directory. These FEs reference respective substances of the sub directory and the file. The substance of the sub directory contains at least one FID. In other words, in the UDF, except for the root directory, corresponding to FIDs and FEs as pointers, FIDs, FEs, and substances are successively accessed.

In the UDF, the above-described FIDs, FEs, and substances can be written in any recordable area. Even if information of sub directories and files are related, their FIDs, FEs, and substances can be written to different addresses. The addresses of the FIDs, FEs, and substances may be assigned regardless of the access order.

Figure 1:
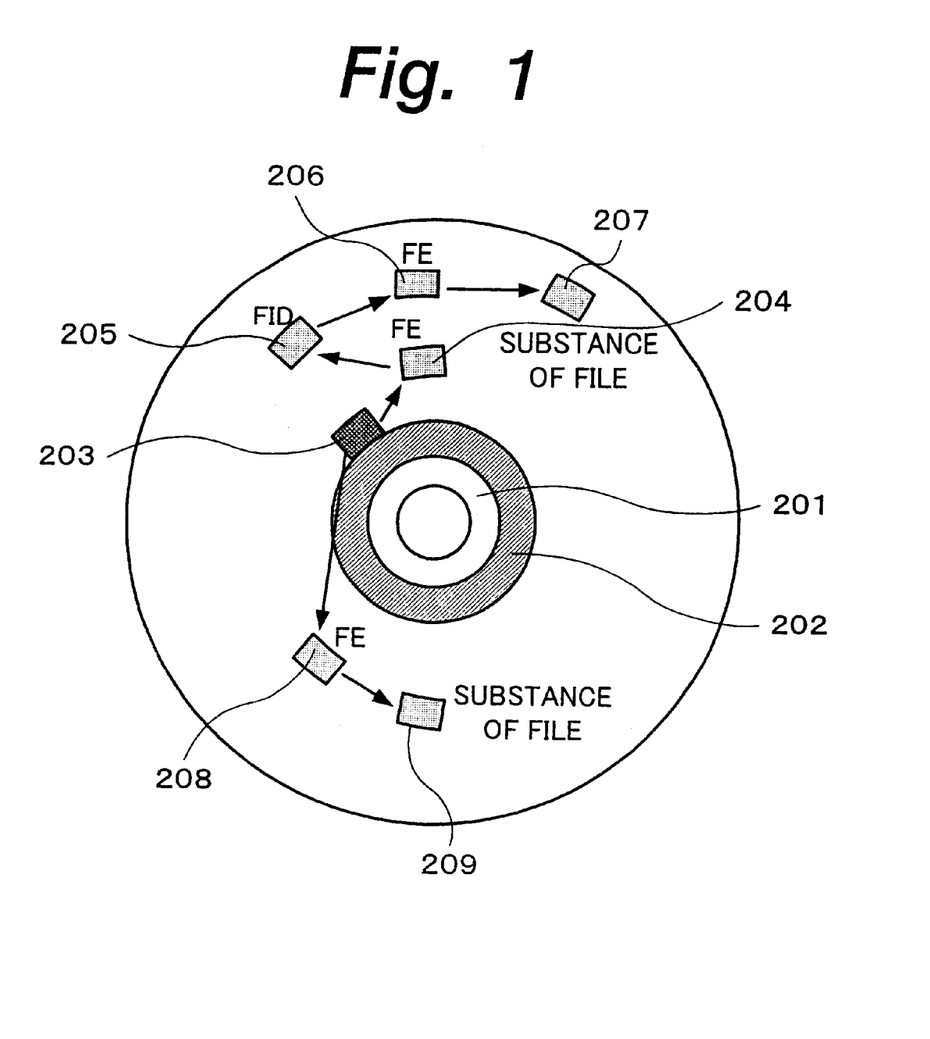
FIG. 1 is a schematic diagram showing an example of a data assignment on a disc corresponding to the conventional UDF.

FIG. 1 shows an example of a data assignment on a disc corresponding to the conventional UDF. Referring to FIG. 1, a lead-in area 201 is formed on the innermost periphery of a disc 200. A system area 202 is formed outside the lead-in area 201. For example, a substance 203 of a root directory is formed outside the system area 202.

Next, as an example, the case of which a file is accessed from the root directory through a sub directory will be described. Corresponding to the FID of the substance 203 of the root directory, an FE 204 of a sub directory at an address that is physically apart from the substance 203 of the root directory is referenced. Corresponding to an AD of the FE 204 of the sub directory, a substance 205 of a sub directory at an address that is physically apart from the FE 204 of the sub directory is referenced. Likewise, an FID of the substance 205 of the sub directory is referenced. An FE 206 of a file at an address that is physically apart form the substance 205 of the sub directory is referenced. Corresponding to the AD of the FE 206 of the file, a substance 207 of a file at an address that is physically apart from the FE 206 of the file is referenced.

As another example, in the case of which a file is directly referenced from the root directory, the FID of the substance 203 of the root directory is referenced. An FE 208 of a file at an address that is physically apart from the substance 203 of the root directory is referenced. Corresponding to an AD of the FE 208, a substance 209 of a file at an address that is physically apart from the FE 208 of the file is referenced.

Conventionally, when information of directories and files is scattered on a disc, the information cannot be quickly read.

In other words, when one file is accessed with reference to pointers at different addresses, the disc seek time becomes long. In other words, information on the disc cannot be quickly accessed. In particular, this problem is serious in a disc shaped record medium whose access time is longer than a hard disk or the like.

To solve such a problem, pointer information such as FIDs and FEs may be recorded together in a predetermined area. However, in such a case, when a file is deleted from a disc, since an FE thereof is deleted, another file may be written to a blank address for the FE. In such a situation, the pointer information recorded in the predetermined area may be separated. As a result, the above-described problem will take place.

In addition, when files that should be successively accessed are scattered on the disc, these files may not be successively read.

OBJECTS AND SUMMARY OF THE INVENTION

Therefore, an object of the present invention is to provide a recording apparatus, a recording method, and a record medium that allow files that have been successively written to be quickly accessed.

A first aspect of the present invention is a recording method for recording data to a disc shaped record medium corresponding to a hierarchical file system and referencing the hierarchical structure using pointer information, comprising the step of recording pointer information for referencing the substance of a file that is recorded to the disc shaped record medium in such a manner the pointer information and the substance of the file are recorded at successive addresses.

A second aspect of the present invention is a recording apparatus for recording data to a disc shaped record medium corresponding to a hierarchical file system and referencing the hierarchical structure using pointer information, comprising a means for recording pointer information for referencing the substance of a file that is recorded to the disc shaped record medium in such a manner the pointer information and the substance of the file are recorded at successive addresses.

A third aspect of the present invention is a disc shaped record medium for recording data corresponding to a hierarchical file system and referencing the hierarchical structure using pointer information, wherein the pointer information for referencing the substance of a file that is recorded and the substance of the file are recorded in such a manner the pointer information and the substance of the file are recorded at successive addresses.

As described above, according to the present invention, pointer information that allows the substance of a file that is recorded to be referenced and the substance of the file are successively recorded to the disc shaped record medium. Thus, the file can be quickly accessed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram showing an example of the content of a volume information area;

DETAILED DESCRIPTION OF THE PREFERRED EMBODIMENTS

Figure 2:
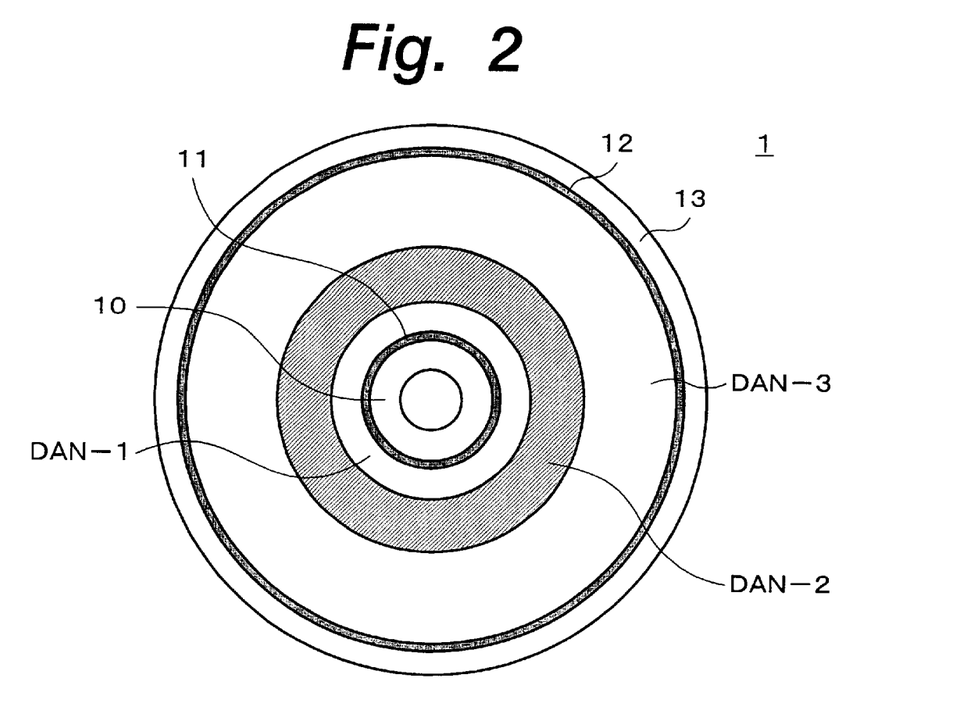
FIG. 2 is a schematic diagram showing a logical format of a disc shaped record medium according to the present invention.

Next, with reference to the accompanying drawings, a first embodiment of the present invention will be described. FIG. 2 shows a logical format of a disc shaped record medium 1 according to the present invention. The logical format of the disc shaped record medium 1 is based on the above-described UDF (Universal Disc Format). On the innermost periphery of the disc shaped record medium 1 (hereinafter referred to as disc 1), a lead-in area 10 is formed. Logical sector numbers (LSNs) are successively assigned from the outside of the lead-in area 10. A volume information area 11, an area DAN-1 (Data Area Number 1), an area DAN-2, an area DAN-3, and a volume information area 12 are successively formed. On the outermost periphery, a lead-out area 13 is formed. Logical block numbers are assigned to the area DAN-1 to the area DAN-3.

FIG. 3 shows an example of the content of each of the volume information areas 11 and 12. The volume information area 11 contains a VRS (Volume Recognition Sequence), an MVDS (Main Volume Description Sequence), and a VIS (Logical Volume Sequence) corresponding to the UDF. At the end of the volume information area 11, an anchor point is placed. The content of the volume information area 11 is dually written as a RVDS (Reserve Volume Descriptor Sequence) to the volume information area 12 formed inside the lead-out area 13. At the beginning and at the end of the volume information area 12, one anchor point is placed. The anchor point at the end of the volume information area 12 corresponds to the last logical sector number.

An area from the logical sector number 272 to (the last logical sector number—272) is a partition area referred to as LVS (Logical Volume Space). In the LVS, the area DAN-1 to the area DAN-3 are formed. The area DAN-1 formed on the innermost periphery side of the LVS is composed of an FSD (File Set Descriptor) and an SBD (Space Bitmap Descriptor) corresponding to the UDF. The SBD represents blank area information of the disc 1 with flags for individual sectors. The area DAN-1 represents the address of an FE of the root directory of the hierarchical structure of the file system.

The area DAN-2 is an area that contains an FE (File Entry) of a directory and an FID (File ID) of the substance of the directory. In other words, the FE of the directory and the FID of the substance thereof are together recorded in the area DAN-2. When a disc is formatted (that will be described later), a predetermined record capacity is allocated for the area DAN-2. As will be described later, an unused area of the area DAN-2 is allocated as a file with a particular attribute designated. Hereinafter, a file composed of an unused area of the area DAN-2 is referred to as EFI (Entry Information File). When an unused area of the area DAN-2 is treated as an EIF, the above-described SBD is suppressed from recognizing the unused area as a blank area.

As was described in the section of Related Art Reference, an FE represents the location (address) and size of the substance of a file or a directory. An AD (Allocation Descriptor) of the FE represents their information. An FID represents the name, location (address), and size of a file or a directory. An ICB (Information Control Block) of the FID represent their information.

The area DAN-3 is an area that contains an FE of a file and the substance thereof. In the area DAN-3, an FE of a file and the substance of the file corresponding to the FE are placed at successive addresses. For example, corresponding to the start address and size of the file represented in the AD of the FE of the file, the address of the substance of the file is obtained. When a file is added, an FE of the file and the substance thereof are placed at successive addresses preceded by successive addresses of an FE of an existing file and the substance thereof.

For example, corresponding to an AD of an FE of a file and the start address and size of a file represented in the FID of each of subdirectories and the root directory, the addresses of the FE of the file and the substance thereof can be obtained. Alternatively, corresponding to the SBD of the area DAN-1, the addresses of an FE of a file and the substance thereof can be obtained in such a manner that a blank area does not take place in the area DAN-3.

In such a manner, since an FE of a file and the substance thereof are placed at successive addresses, the file can be quickly accessed.

Figure 4:
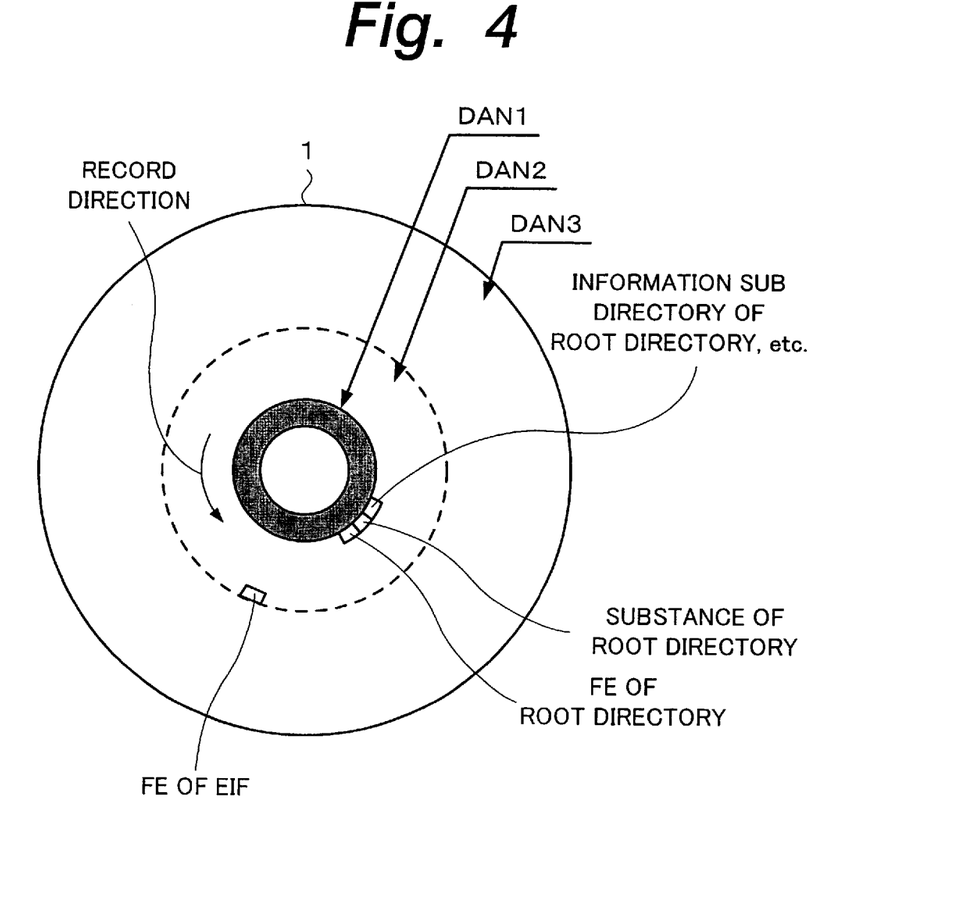
FIG. 4 is a schematic diagram for explaining a managing method for a directory, a file, and a blank area according to the present invention.
Figure 5:
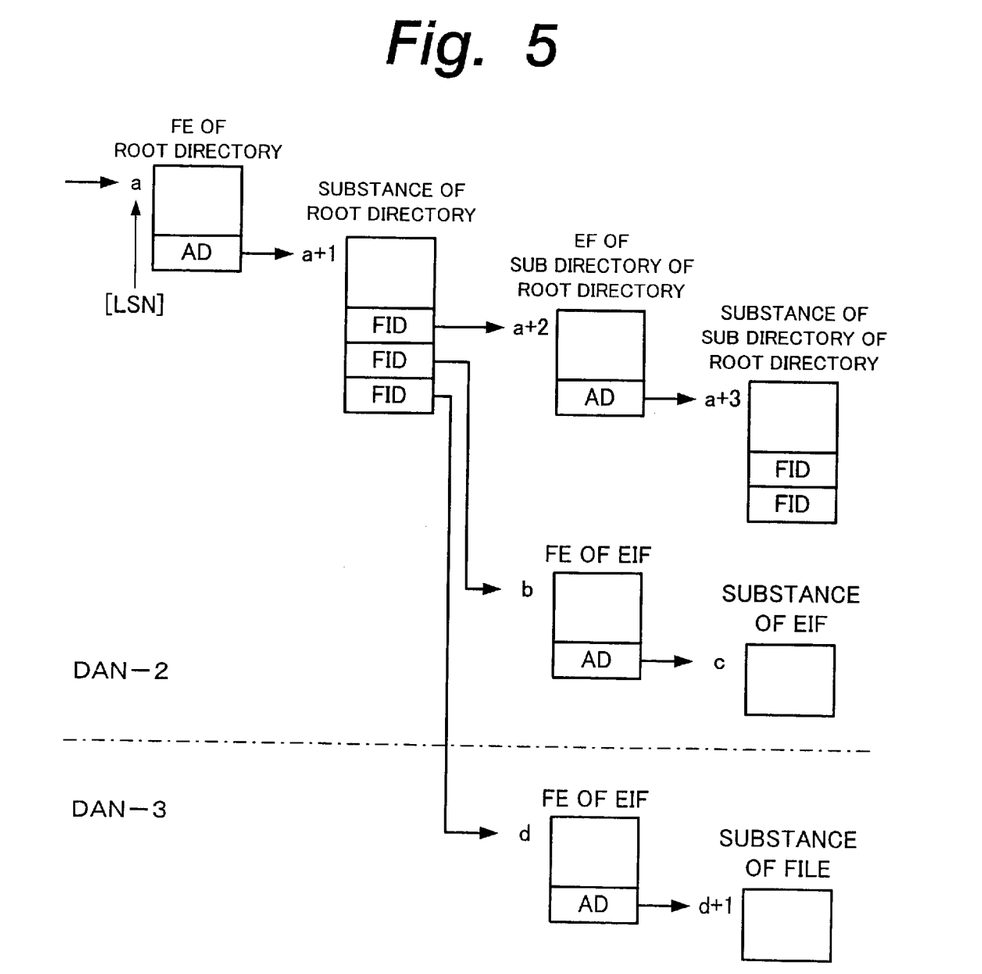
FIG. 5 is a schematic diagram for explaining a managing method for a directory, a file, and a blank area according to the present invention.

Next, with reference to FIGS. 4 and 5, a method for managing a directory, a file, and a blank area according to the present invention will be described. FIG. 4 is a partial view showing only the area DAN-1 to the area DAN-3 shown in FIG. 2. As shown in FIG. 4, data is recorded counterclockwise. FIG. 5 shows a hierarchical structure of FEs, FIDs, and substances.

For example, an FE of the root directory starts at LSN=a. An AD of an FE of the root directory represents the address and size of the substance of the root directory. The substance of the root directory and the FE of the root directory are placed at successive addresses. For example, the address of the substance of the root directory is LSN=a+1. The substance of the root directory contains at least one FID. An FID represents the name, address, and size of a sub directory of the root directory. The FE of the sub directory and the substance of the root directory are placed at successive addresses. For example, the address of the FE of the sub directory is at LSN=a+2. An AD of the FE of the sub directory represents the address and size of the substance of the sub directory. The substance of the sub directory and the FE of the sub directory are placed at successive addresses. For example, the address of the substance of the sub directory is at LSN=a+3. The substance of the sub directory contains at least one FID. An FID represents the name, address, and size of a file or another sub directory.

Since FEs, FIDs, and substances are referenced as shown in FIG. 5, the substance of the root directory, information of a sub directory of the root directory, and so forth are placed at successive addresses against the address of the FE of the root directory at a predetermined position of the innermost periphery of the area DAN-2 as shown in FIG. 4.

On the other hand, with reference to FIG. 5, an FID of the substance of the root directory represents the name, address, and size of an FE in the EIF. An AD of an FE of an EIF represents the address and size of the substance of the EIF. In such a manner, since an EIF is treated as a file, as with another file, the FE represents the address and size of the EIF.

Figure 6A:
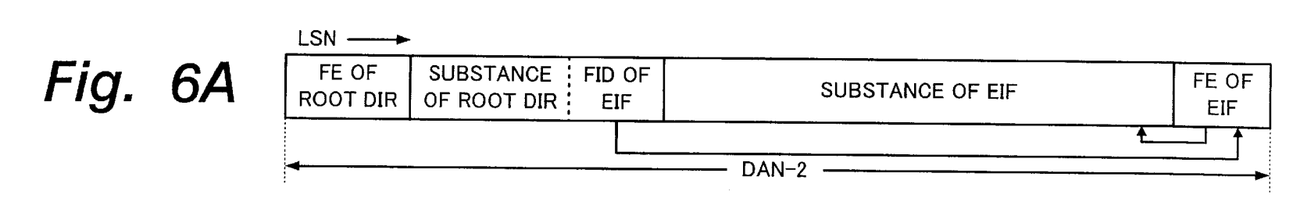
FIGS. 6A to 6E are schematic diagrams for explaining a method for placing an EIF in an area DAN-2.

As shown in FIG. 6A, an FE of an EIF is placed after the substance of the EIF. As will be described later, the start address and/or end address and the size of the substance of the EIF vary depending on the amount of each information written to the area DAN-2.

The FE of the root directory, the substance of the root directory, the FE of the sub directory of the root directory, the substance of the sub directory of the root directory, the FE of the EIF, and the substance of the EIF are placed in the area DAN-2.

An FE of a file and the substance thereof are placed in the area DAN-3. The substance of a file is an area for user data or the like. As shown in FIG. 5, an FID of the substance of the root directory represents the name, address, and size of an FE of a file. The FE of the file is placed in the area DAN-3. At that point, the start address of the FE of the file is at LSN=d. An AD of the FE of the file represents the address and size of the substance of the file. The substance of the file and the FE of the file are placed at successive address. For example, the start address of the substance of the file is at LSN=d+1.

As was described above, when the disc 1 is formed, the area DAN-2 is allocated. Next, an example of the format method for the disc 1 will be described in brief. In this example, the lead-in area 10 and the lead-out area 13 are formed when the disc 1 is fabricated. The format process is performed from the inner periphery to the outer periphery of the disc 1.

When the format process is started, the above-described VRS, MVDS, and LVIS are formed from the outside of the lead-in area 10. Thereafter, the LVS is formed. In the LVS, the area DAN-1 is formed at first. Thereafter, the FDS is formed and the location of the root directory is designated. Thereafter, the SBD is formed. At that point, the area of the above-described EIF is treated as a used area with the SDB. As a result, the area of the EIF is allocated.

After the SBD and the area DAN-1 are formed, the area DAN-2 is formed from the outside of the area DAN-1. When the area DAN-2 is formed, corresponding to the FSD of the area DAN-1, the FE of the root directory and the substance thereof are placed at predetermined successive addresses. Next, the FID of the EIF is added to the substance of the formed root directory. The FID represents the address of the FE of the EIF.

At that point, a hidden file attribute of the EIF is designated in the FID and the FE. An attribute of the EIF prevents the EIF from being erased, rewritten, or moved by another device or an OS (Operating System). For example, "hidden file attribute", "system file attribute", and "read only file attribute" are also designated as attributes of the EIF. that prevents a file from being browsed in a conventional method. The "system file attribute" is an attribute that represents that a file is a system file that is necessary for the system. The "read only file attribute" is an attribute that represents that a file is a read-only file of which the system prohibits the file from being changed or erased. When these three attributes are designated to a file, the file is prohibited from being erased, rewritten, and moved. These attributes can be removed in a predetermined manner.

Next, the FE of the EIF is formed. As was described above, the FE represents the address and size of the file. Thus, when the FE is designated, a dummy file is allocated. The FE of the EIF can be designated with two attributes "read only file attribute" and "system file attribute".

Thus, when an EIF is placed in the area DAN-2, a blank area of the area DAN-2 can be allocated. As was described above, after the disc 1 is formatted, an FE of a sub directory and the substance thereof are placed in the area DAN-2. At that point, the area of the EIF of the area DAN-2 is reduced for the FE of the sub directory and the substance thereof.

As will be described later, the area DAN-2 may be formed in another manner, not in the above-described manner. In the case, the locations of the individual information elements in the area DAN-2 vary.

In such a manner, the area DAN-2 is formed. Although the area DAN-3 is formed outside the area DAN-2, no process is performed for the area DAN-3. For example, the area DAN-3 is skipped. Thereafter, the RVDS is formed. As described above, the information of the MVDS that has been formed is dually written as the RVDS. After the RVDS is formed, the format process for the disc 1 is completed.

In the above example, the FE of the root directory, the substance thereof, the EIF, and the FE thereof are successively placed in the area DAT-2. However, the present invention is not limited to such an example. According to a first embodiment of the present invention, the address of the FE of the EIF is fixed. The location of the FE of the EIF may be (1) before the root directory, (2) after the root directory, or (3) at the boundary between the area DAN-2 and the area DAN-3. Next, with reference to FIGS. 6A to 6E, the method for placing the EIF in the area DAN-2 will be described corresponding to the individual cases.

FIGS. 6A to 6E each show the area DAN-2. The area DAN-2 is preceded by the area DAN-1 (namely, on the left side of the area DAN-2, the area DAN-1 is formed). Thus, the LSN increases to the right. In FIGS. 6A to 6E and 7A to 7D, a directory is abbreviated as "Dir".

In FIG. 6A, the FE of the root directory and the substance thereof are placed on the beginning side of the area DAN-2. The FE of the EIF is placed on the end side of the area DAN-2. The substance of the EIF is placed between the end of the substance of the root directory and the beginning of the FE of the EIF. In the example shown in FIG. 6A, the FID of the EIF of the substance of the root directory represents the address of the FE of the EIF placed on the end side of the area DAN-2. The FE of the EIF represents the start address of the substance of the EIF. In other words, the FE of the EIF is preceded by the substance of the EIF.

In the example shown in FIG. 6A, information (the FE and the substance) of a sub directory is added after the substance of the root directory placed in the area DAN-2. The substance of the EIF is reduced from the beginning for the information of the sub directory. As a result, the start address of the EIF written in the AD of the FE of the EIF is rewritten.

In the example shown in FIG. 6A, when the address of the FE of the EIF is pre-designated, the EIF can be accessed without need to reference the FID of the substance of the root directory. Thus, the FID corresponding to the EIF of the substance of the root directory is prevented from being rewritten. Consequently, even if the FE of the EIF is rewritten due to a particular reason, unless the FID of the EIF is lost, the EIF can be easily restored.

Figures 6B, 6C:
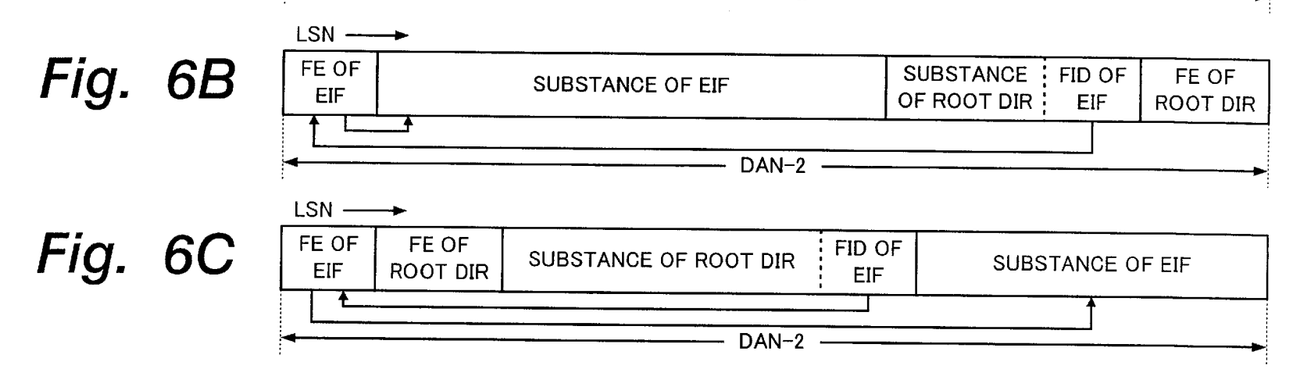
Figure 6D:
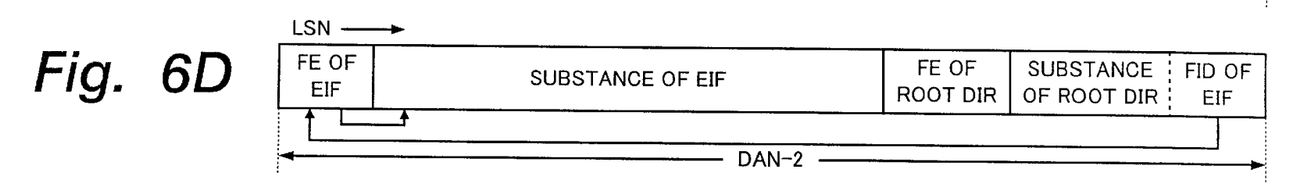

FIG. 6B shows an example of which the FE of the EIF and the substance thereof are placed on the beginning side of the area DAN-2 and the substance of the root directory and the FE thereof are placed on the end side of the area DAN-2. The FID of the substance of the root directory represents the FE of the EIF. The AD of the FE of the EIF represents the substance of the EIF.

In the example shown in FIG. 6B, the substance of the EIF is reduced from the beginning for the information of the sub directory that is added to the area DAN-2. As a result, the FE of the EIF is rewritten. In the example shown in FIG. 6B, the FE of the root directory placed on the end side of the area DAN-2 is designated after the format process is performed. For example, after the format process is performed, the root directory is placed. At that point, the FE of the root directory is placed.

Normally, in a computer system, a disc is accessed from the root directory. Thus, as shown in FIG. 6B, when the FE of the EIF and the substance thereof are placed after the FE of the EIF and the substance thereof, the FE of the root directory and the substance thereof are secured against the FE of the EIF and the substance thereof.

Figure 6E:
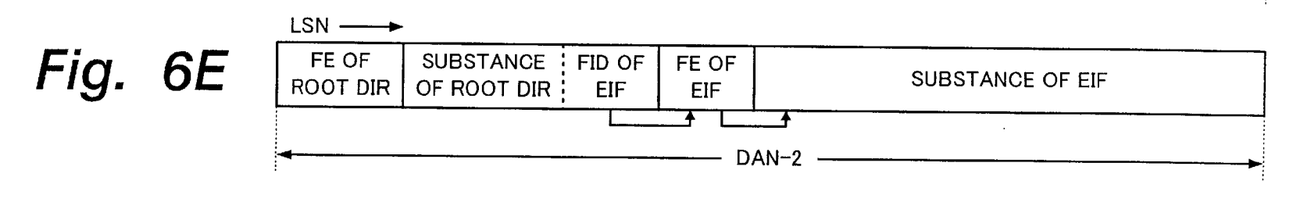

Likewise, FIG. 6C shows an example of which the FE of the EIF is placed before the FE of the root directory. In other words, the FE of the EIF and the FE of the root directory are placed on the beginning side of the area DAN-2. Thereafter, the substance of the root directory and the substance of the EIF are placed and the FE of the root directory and the substance thereof are placed on the end side of the area DAN-2. FIG. 6E shows an example of which the FE of the root directory and the substance thereof are placed on the beginning side of the area DAN-2 and the FE of the EIF and the substance thereof are placed on the end side of the area DAN-2.

Next, the method for adding a sub directory after the format process will be described in detail. As was described above, the FE of the sub directory and the substance thereof are placed in a reduced area of the substance of the EIF of the area DAN-2. Next, with reference to FIGS. 7A to 7D, the example in the case shown in FIG. 6A will be described.

Information elements shown in FIGS. 7A to 7D are same as those shown in FIGS. 6A to 6E.

Figure 7A:
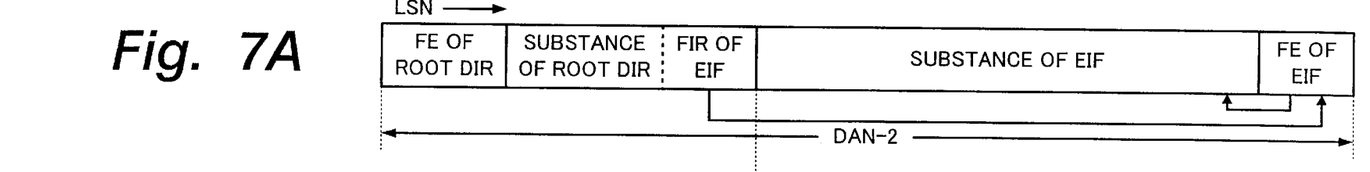
FIGS. 7A to 7D are schematic diagrams for explaining a method for adding a sub directory after a format process is performed.
Figure 7B:
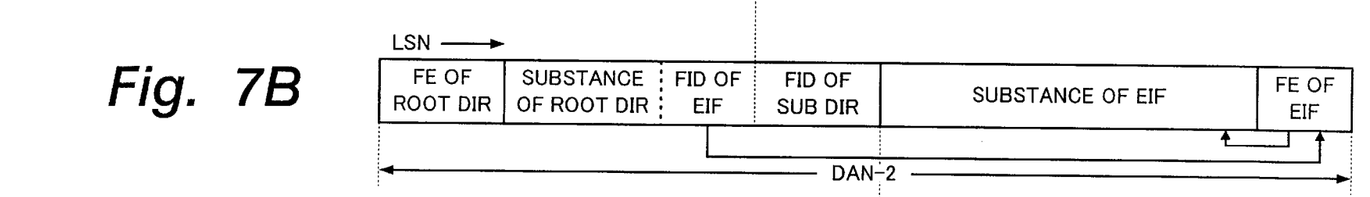

FIG. 7A shows the content of the area DAN-2 in the state that the format process has been just performed. FIG. 7A corresponds to FIG. 6A. In the state shown in FIG. 7A, a sub directory is added. As shown in FIG. 7B, an FID that represents the sub directory is added after the substance of the root directory. At that point, the size of the area of the substance of the EIF is reduced. In reality, when the last sector of the substance of the root directory becomes full, the substance of the EIF is reduced. Otherwise, it is not necessary to reduce the substance of the EIF.

Figure 7C:
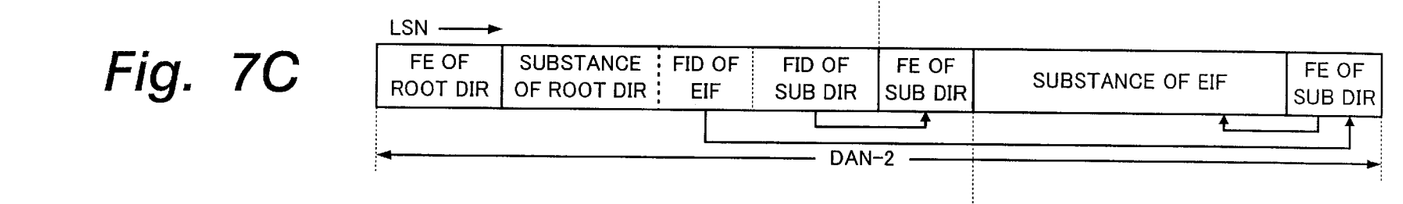
Figure 7D:
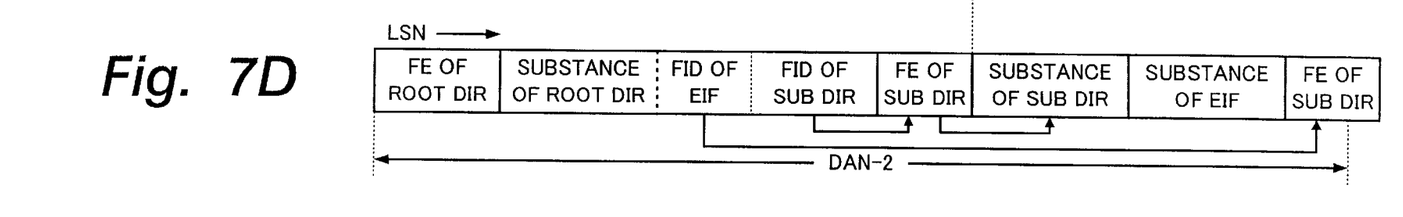

Thereafter, to add the FE of the sub directory, the size of the EIF is further reduced (see FIG. 7C). In this case, it is necessary to reduce the size of the substance of the EIF. In addition, as shown in FIG. 7D, to add the substance of the sub directory, the size of the EIF is further reduced. In addition, to reflect the change of the size of the substance of the EIF, the information of the FE of the EIF is rewritten.

In the above example, the case of which a sub directory is added was described. However, it should be noted that this method can be applied to the case of which a file is added to the root directory.

As with the example shown in FIG. 6E, the FE of the EIF may be placed at the location of the FE of the sub directory. In such a case, it is necessary to move the FE of the EIF to another sector and then update the address information of the FID corresponding to the EIF. In the structure shown in FIG. 6A, such a process is not required.

Figure 8:
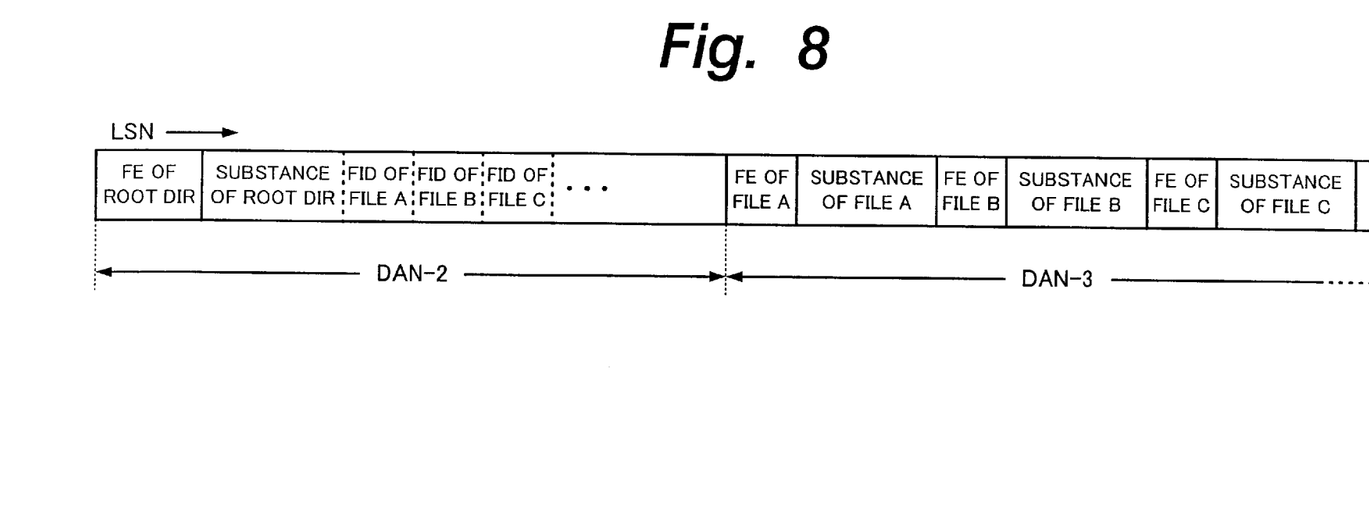
FIG. 8 is a schematic diagram for explaining a process for adding a file to the root directory.

Next, with reference to FIG. 8, a process for adding a file to the root directory will be described. As was described above, an FE of a file and the substance thereof are placed in the area DAN-3. When a file is added to the root directory, an FID of the file is written to the substance of the root directory. When necessary, the size of the EIF of the area DAN-2 is reduced. As a result, the FE of the EIF is rewritten.

The FE of the file (file A) that is added is placed at an address represented by the FID added to the substance of the root directory. The substance of the file A and the FE of the file A are placed at successive addresses. When files B, C, and so forth are written to the disc, the FE of the file B is placed after the end of the substance of the file A. The FE of the file B and the substance thereof are placed at successive addresses. This operation applies to the file C. In other words, the substance of the file B and the FE of the file C are placed at successive addresses. The FE of the file C and the substance thereof are placed at successive addresses.

Since the substance of a file is placed just after the FE thereof, the file can be successively accessed. When a plurality of files are successively placed, they can be more quickly accessed.

When many sub directories are added to the root directory of the area DAN-2, many FIDs of the substance of the root directory, many FEs of sub directories, and many substances thereof are added. As a result, the area DAN-2 to become full with the FIDs, FEs and substances of the sub directories.

To solve such a problem, according to the present invention, when the disc 1 has a sufficient space, new areas DAN-2 and DAN-3 can be formed after the end of files of the area DAN-3. Hereinafter, the areas DAN-2 and DAN-3 that are newly formed are referred to as areas DAN-2' and DAN-3', respectively.

Figure 9:
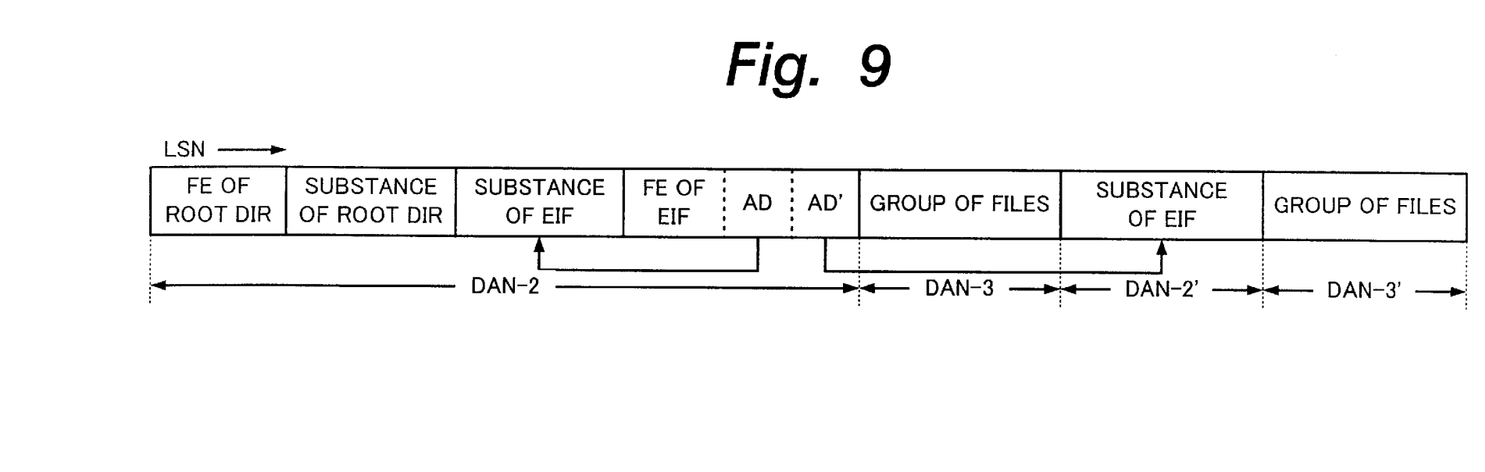
FIG. 9 is a schematic diagram showing areas DAN-2' and DAN-3' that are newly added.

FIG. 9 shows the area DAN-2' and the area DAN-3'. The area DAN-2' is formed in such a manner that an AD' is added after the AD of the FE of the EIF in the area DAN-2 and thereby the size of the EIF is increased. The AD' represents the address of the end of the files of the area DAN-3 and the size of the EIF' added as the area DAN-2'. The area DAN-3' is formed after the substance of the EIF'. The FE and the substance of the sub directory added to the root directory are written to the area DAN-2'. The file is written in the area DAN-3'.

At that point, the SBD of the area DAN-1 is rewritten corresponding to the EIF' placed in the area DAN-2'. As a result, the area of the EIF' placed in the area DAN-2' is allocated.

The EIF may be destroyed due to a particular reason. When the EIF is destroyed, the substance of the FE of the sub directory is not lost. At that point, a blank area of the area DAN-2 is unallocated. The substance of the file is written in the area DAN-2. Thus, when the EIF is destroyed, it should be restored.

The EIF is restored as follows. For example, when the EIF is erased and a file is added to the same directory, the FID of the EIF of the substance of the root directory is erased.

In the first case, only the FID of the substance of the root directory may be erased. The location of the FE of the EIF may be left. In addition, the location of the FE of the EIF may be known. In that case, the FID of the EIF is created corresponding to the FE of the EIF. The created FID is added to the substance of the root directory. As a result, the EIF is restored.

In the second case, the location of the FE of the EIF may be unknown. In that case, all the area DAN-2 is scanned and re-calculated so as to extract the remaining portion of the EIF. By calculating the difference between the extracted portion and the area DAN-2, the area of the EIF can be obtained. Since the EIF is allocated as a single area in the area DAN-2, such a restoring method can be used.

Figure 10:
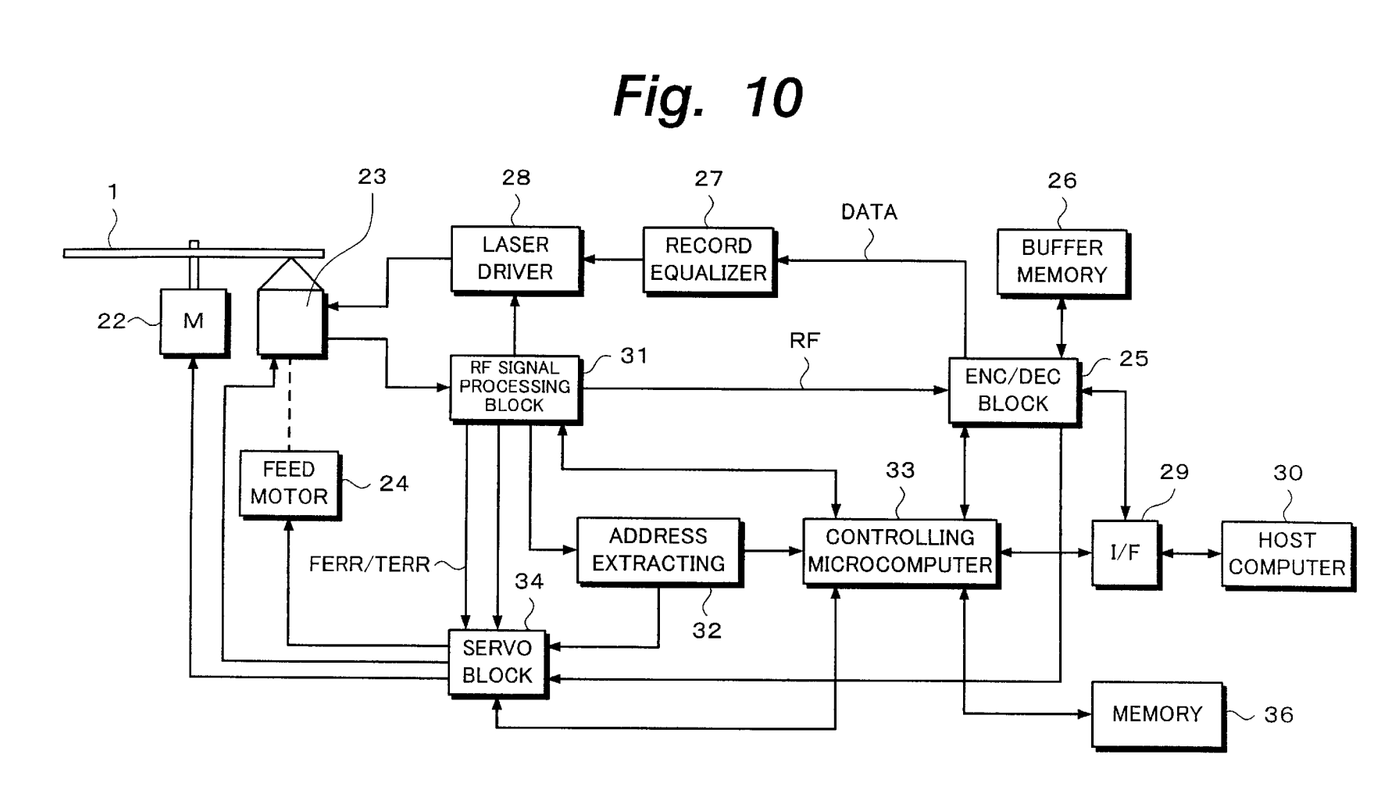
FIG. 10 is a block diagram showing an example of the structure of a drive device according to the present invention.

FIG. 10 shows an example of the structure of a drive device according to the present invention. In this example, the disc 1 has a record layer composed of phase change metal material. The drive device adjusts the laser output, controls the temperature of the record layer, and changes the crystal/non-crystal state so as to record data to the disc 1.

The disc 1 is rotated and driven by a spindle motor 22. An optical pickup 23 records and reproduces data to/from the disc 1. The optical pickup 23 is traveled in the radius direction of the disc 1 by a feed motor 24.

Data is supplied from an external host computer 30 to the drive through an interface 29 (for example, SCSI (Small Computer System Interface)). An encoder/decoder block 25 is connected to the interface 29. A buffer memory 26 is connected to the encoder/decoder block 25. The buffer memory 26 stores write data or read data.

The write data is supplied to the encoder/decoder block 25 through the interface 29. When data is recorded, the encoder/decoder block 25 generates data in the above-described format. Thereafter, the encoder/decoder block 25 encodes data corresponding to the format. When data is reproduced, the encoder/decoder block 25 performs a decode process for the data and outputs digital data to the host computer 30 through the interface 29. The encoder/decoder block 25 adds an address to the data as a sub code and to a header of the data.

The encoder/decoder block 25 supplies the record data to a laser driver 28 through an equalizer 27. The laser driver 28 generates a drive waveform having a predetermined level necessary for recording data to the disc 1. An output signal of the laser driver 28 is supplied to the optical pickup 23.

The optical pickup 23 records the data to the disc 1. The laser driver 28 properly controls the laser power corresponding to an APC (Automatic Power Control) operation of an RF signal processing block 31. In addition, a signal corresponding to reflected light of the disc 1 is supplied to the RF signal processing block 31. An address extracting circuit 32 extracts address information from the signal supplied from the RF signal processing block 31. The extracted address information is supplied to a controlling microcomputer 33 (that will be described later).

In the RF signal processing block 31, a matrix amplifier calculates a detection signal of a photo detector and generates a tracking error signal TERR and a focus error signal FERR. The tracking error signal and the focus error signal are supplied to a servo block 34.

The controlling microcomputer 33 controls a seek operation using the extracted address. In addition, the controlling microcomputer 33 controls the laser power using a control signal. The controlling microcomputer 33 comprises a CPU (Central Processing Unit), a RAM (Random Access Memory), and a ROM (Read Only Memory). The controlling microcomputer 33 controls all the structural portions of the drive that are the interface 29, the encoder/decoder block 25, the RF signal processing block 31, the servo block 34, and so forth. A memory 36 can be connected to the controlling microcomputer 33.

An RF signal reproduced from the disc 1 is supplied to the encoder/decoder block 25. The encoder/decoder block 25 performs a decode process corresponding to a predetermined format such as demodulation process for demodulating modulated record data and a decode process for decoding error correction code (namely, error correction process). The encoder/decoder block 25 stores reproduction data to the buffer memory 26. When the encoder/decoder block 25 receives a read command from the host computer 30, the encoder/decoder block 25 transfers the read data to the host computer 30 through the interface 29.

A frame synchronous signal, the tracking error signal, and the focus error signal are supplied from the RF signal processing block 31 to the servo block 34. In addition, address information is supplied from the address extracting circuit 32 to the servo block 34. The servo block 34 performs a tracking servo operation and a focus servo operation for the optical pickup 23. In addition, the servo block 34 performs a thread servo operation for the feed motor 24.

In the above example, the host computer 30 is connected to the drive device. However, it should be noted that the present invention is not limited to such a structure. Instead, another device can be connected to the drive device as long as the connected device inputs and outputs a digital signal and is compatible with the interface of the drive device. For example, the drive device may be built in a portable digital video camera recorder that records a photographed picture to a disc shaped record medium.

In the above example, format data for the disc 1 is generated by the encoder/decoder block 25. However, the present invention is not limited to such an example. In other words, the format data may be generated by the controlling microcomputer 33. Alternatively, the format data may be supplied from the host computer 30.

Next, a second embodiment of the present invention will be described. In the above example, a blank area of the area DAN-2 is managed as a file. An FE of a sub directory of the root directory and the substance thereof are added by reducing the size of the EIF that has been allocated in the format process as a dummy file in the area DAN-2. In contrast, according to the second embodiment of the present invention, a blank area of the area DAN-2 is managed in a memory.

The format of the disc 1 and the structure of the drive device according to the second embodiment are almost the same as those according to the first embodiment.

When a disc 1' is formatted, an area DAN-1 and an area DAN-2 are formed. At that point, unlike with the first embodiment, a particular file EIF for a blank area of the area DAN-2 is not formed. In other words, although a particular area as the area DAN-2 is allocated, a dummy file for a blank area thereof is not placed. Thus, the SBD placed in the area DAN-1 represents that the area is a blank area.

When the disc 1' that has been formatted in such a manner is loaded to the drive device or the power thereof is turned on, the drive device scans all the area DAN-2 and detects a blank area. The drive device stores information about the detected blank area as a blank area management table to its memory. The blank area management table is stored to the memory 36 of the structure shown in FIG. 10. The blank area management table contains a list of the start address or the end address and the length of the blank area.

The structure of the blank area management table is not limited to such an example. Alternatively, the area DAN-2 may be scanned sector by sector. As a result, bit map data with flags for individual sectors may be structured.

In other words, according to the second embodiment of the present invention, the AD about the blank area information of the area DAN-2 is managed in the memory. Thus, unlike with the first embodiment, it is not necessary to allocate the EIF in the area DAN-2. As a result, it is not necessary to place the FE of the EIF. Thus, the area DAN-2 can be more effectively used. In addition, since the blank area information of the area DAN-2 is managed in the memory, data of the area DAN-2 can be more quickly changed. As a result, files and directories of the disc 1' can be quickly rewritten, added, and deleted.

According to the present invention, management information of the file system such as information about the root directory and FEs and substances of sub directories are written together to the area DAN-2 of the disc 1'. Thus, when the disc 1' is loaded to the drive or the power thereof is turned on, the disc 1' can be more quickly scanned so as to generate the blank area management table than the case that such information is placed on the disc.

As with the first embodiment, directories and files on the disc 1' are accessed corresponding to information of the area DAN-2. When a file or a directory is added, an element corresponding to information of the area DAN-2 is written in the blank area management table stored in the memory. In addition, real information of the area DAN-2 of the disc 1' is rewritten.

The second embodiment of the present invention can be applied to a device that generally records data such as a personal computer. More preferably, the second embodiment of the present invention can be applied to a dedicated device such as a portable digital video camera video reorder that records a photographed picture to a disc shaped record medium.

In addition, in the above example, the present invention is applied to an attachable/detachable disc shaped record medium such as an optical disc or a magneto-optical disc. However, it should be noted that the present invention can be applied to another type of a record medium as long as recorded data is managed with particular management information. For example, the present invention can be applied to a fixed drive such as a hard disk drive.

As was described above, according to the present invention, names, addresses, lengths, and so forth of directories, files, and so forth managed on a disc are recorded together in a predetermined area (area DAN-2) on the disc. Thus, such management information can be quickly read.

In addition, according to the present invention, when a file is added, since information about the file and the substance thereof are written at successive addresses, the substance of the file can be quickly accessed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A recording method for recording data to a disc shaped record medium corresponding to a universal disc format employing a hierarchical file system and referencing the hierarchical structure using pointer information including a file identifier descriptor and a file entry, comprising the step of:

recording said pointer information for referencing the substance of a file that is recorded to the disc shaped record medium in such a manner the pointer information and the substance of the file are recorded at successive addresses.

2. The recording method as set forth in claim 1,
   wherein the substance of the file is recorded at an address just after the address of the pointer information.

3. The recording method as set forth in claim 2,
   wherein when another file is chronologically successively written after the existing file, pointer information of another file is recorded at an address just after the address of the substance of the existing file.

4. A recording apparatus for recording data to a disc shaped record medium corresponding to a universal disc format employing a hierarchical file system and referencing the hierarchical structure using pointer information including a file identifier descriptor and a file entry, comprising:

means for recording said pointer information for referencing the substance of a file that is recorded to the disc shaped record medium in such a manner the pointer information and the substance of the file are recorded at successive addresses.

5. A disc shaped record medium for recording data corresponding to a universal disc format employing a hierarchical file system and referencing the hierarchical structure using pointer information including a file identifier descriptor and a file entry, wherein the pointer information for referencing the substance of a file that is recorded and the substance of the file are recorded in such a manner the pointer information and the substance of the file are recorded at successive addresses.

6. The record medium as set forth in claim 5,
   wherein the substance of the file is recorded at an address just after the address of the pointer information.

7. The record medium as set forth in claim 6,
   wherein when another file is chronologically successively written after the existing file, pointer information of another file is recorded at an address just after the address of the substance of the existing file.

* * * * *